(12) United States Patent
Oswald

(10) Patent No.: US 9,956,685 B2
(45) Date of Patent: May 1, 2018

(54) FIFTH WHEEL RELEASE HANDLE YANKER

(71) Applicant: Thomas J. Oswald, Oak Creek, WI (US)

(72) Inventor: Thomas J. Oswald, Oak Creek, WI (US)

( * ) Notice: Subject to any disclaimer, the term of this patent is extended or adjusted under 35 U.S.C. 154(b) by 101 days.

(21) Appl. No.: 14/800,820

(22) Filed: Jul. 16, 2015

(65) Prior Publication Data

US 2015/0314435 A1    Nov. 5, 2015

Related U.S. Application Data

(63) Continuation of application No. 13/459,154, filed on Apr. 28, 2012, now Pat. No. 9,095,969.

(60) Provisional application No. 61/520,947, filed on Jun. 18, 2011.

(51) Int. Cl.
  *B25F 1/00*  (2006.01)
  *B25J 1/04*  (2006.01)

(52) U.S. Cl.
  CPC .. *B25J 1/04* (2013.01); *B25F 1/00* (2013.01)

(58) Field of Classification Search
  CPC ...................................... B25J 1/04; B25F 1/00
  USPC ..... 294/15, 17, 18, 24, 26, 175; 7/100, 138; 280/407.1, 438.1, 433; 254/129, 131
  See application file for complete search history.

(56) References Cited

U.S. PATENT DOCUMENTS

| | | | |
|---|---|---|---|
| 3,644,951 A | | 2/1972 | Colburn |
| RE28,879 E | * | 6/1976 | Verest .................. B25B 25/00 254/131 |
| 4,251,089 A | | 2/1981 | Skaggs |
| 4,531,274 A | | 7/1985 | Sanders |
| D311,482 S | | 10/1990 | Morton |
| 5,065,488 A | * | 11/1991 | Chapman ............... B25B 27/02 292/78 |
| 5,271,115 A | * | 12/1993 | Senters ................ B60T 17/221 7/100 |
| 5,344,201 A | * | 9/1994 | Offin ........................ B25F 1/00 294/175 |
| D370,605 S | * | 6/1996 | Schimeneck ................... D8/14 |
| 5,626,063 A | | 5/1997 | Kosbab |
| D384,253 S | * | 9/1997 | Patino .............................. D8/14 |
| D424,901 S | * | 5/2000 | Landry ........................... D8/107 |
| D475,258 S | | 6/2003 | Wilson |
| 6,634,620 B2 | | 10/2003 | Sim |
| 7,159,260 B2 | | 1/2007 | Hansen |
| 7,347,467 B2 | | 3/2008 | Theobald |
| 7,634,845 B1 | * | 12/2009 | Sim .................... B25B 27/0035 254/25 |
| 7,699,368 B2 | | 4/2010 | Nicol |
| 7,762,529 B1 | | 7/2010 | Scott |
| 8,157,283 B1 | | 4/2012 | Cook |
| 9,095,969 B1 | * | 8/2015 | Oswald .................... B25F 1/00 |

* cited by examiner

*Primary Examiner* — Paul T Chin
(74) *Attorney, Agent, or Firm* — Quarles & Brady LLP

(57) ABSTRACT

A fifth wheel yanker moves a fifth wheel release handle in the sequence needed to operate the release handle in the sequence used by, for example, the Yost brand of fifth wheel Jost fifth wheel safety catch release mechanisms.

11 Claims, 3 Drawing Sheets

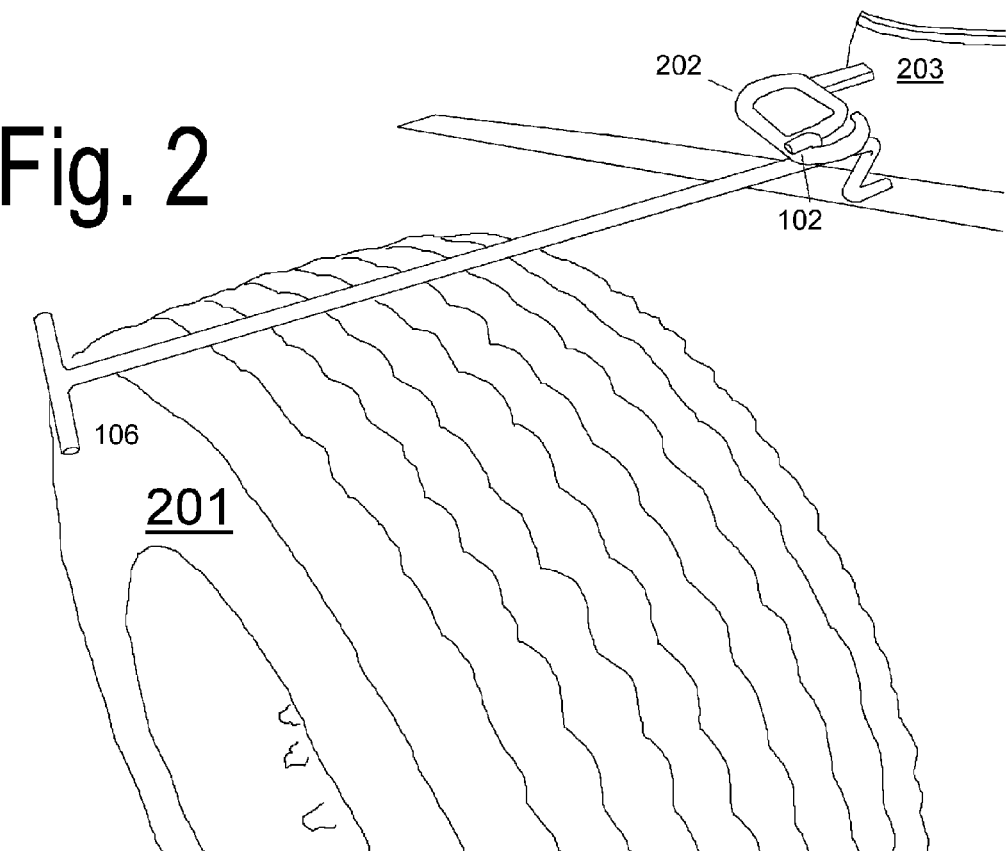

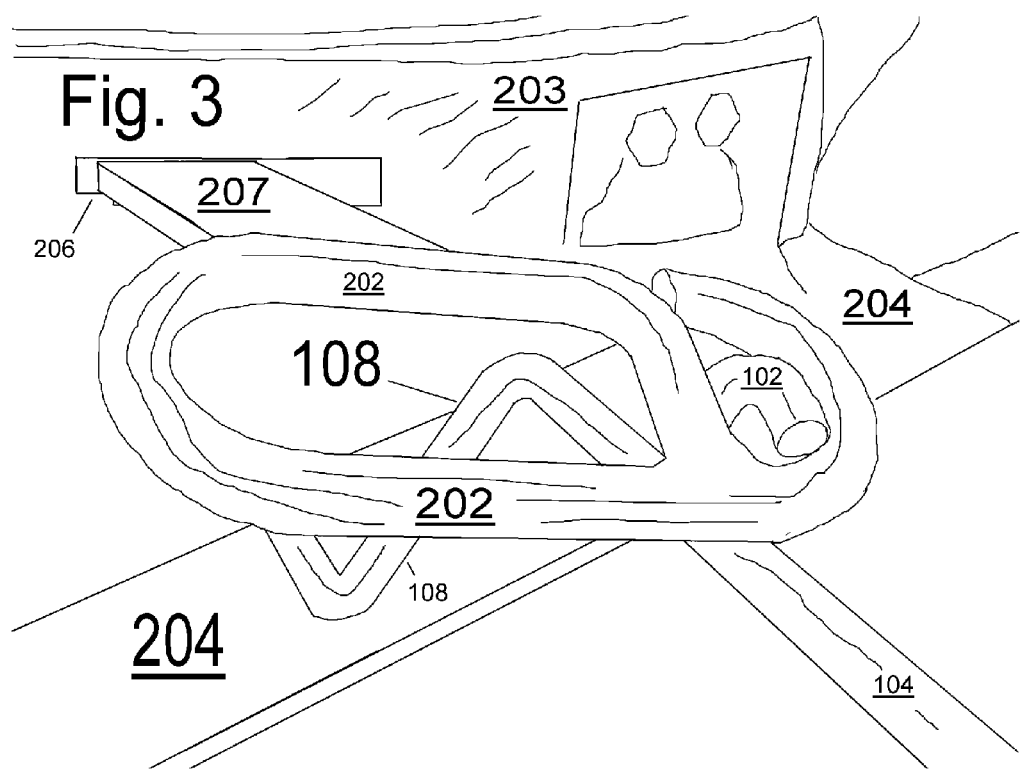

FIFTH WHEEL RELEASE HANDLE YANKER

CROSS-REFERENCES TO RELATED APPLICATIONS

This application is a continuation application of U.S. patent application Ser. No. 13/459,154 filed Apr. 28, 2012 which claims priority from U.S. Provisional Patent Application No. 61/520,947, filed Jun. 18, 2011, contents of which are included by reference.

FIELD OF THE INVENTION

The invention is directed toward the field of tractor-trailer disengagement devices, and more particularly to a device which aids in the release of Jost brand fifth wheel safety-catch latching mechanisms.

BACKGROUND OF THE INVENTION

The fifth wheel of a truck tractor is designed to hook a trailer securely to the tractor. A pin on the trailer slides into a locking mechanism which latches to lock the trailer to the tractor. A release handle is pulled by the trucker to disengage the trailer.

The Jost brand of safety catch release handles, is not simply pulled. Instead, the handle must be raised upward with a force of about twenty pounds, then moved cab-wards, then finally pulled outward to release the trailer. If this sequence is not followed, a notch on the handle snags and prevents accidental or mischievous disengagement. Use of both hands is practically impossible.

Release handles must be used in rain, snow, dark, or storm. The lift-forward- and cabward motion of a Jost release handle can be difficult for even a strong, long-armed trucker to perform. A smaller trucker must wedge himself or herself under the trailer, which is hazardous in slippery weather.

The Occupational Safety and Health Administration (OSHA) Technical Manual "Evaluation of Lifting Tasks: NIOSH Work Practice Guide for Manual Lifting," provides a formula for two-handed lifting, which results in a maximum of approximately ten pounds maximum lift in the situation above. No OSHA guidance could be found for a single hand, but it quite reasonably would be lower. Thus the Jost release handle may require a lifting force far in excess of OSHA guidance.

Examples of many release handle aids are found in the prior art. U.S. Pat. No. 6,935,664 granted Aug. 30, 2005, discloses a foot-operated release lever aid. U.S. Pat. No. 4,251,089 issued Feb. 17, 1981, discloses a force-multiplying lever aid. U.S. Pat. No. 7,591,476 issued Sep. 22, 2009, and U.S. Pat. No. 7,347,467 issued Mar. 25, 2008, disclose multi-purpose release mechanisms.

The upward-cabward-outward motion required by the Jost release lever is not addressed by the prior art, which only provided outward pulling.

It is an object of the invention to provide the upward-cabward-outward forces needed to operate a Jost fifth wheel safety catch release mechanism in a compact form.

SUMMARY OF THE INVENTION

The preferred form of the instant invention utilizes a lever and hook in combination with a handle to provide the needed up-cabward-outward motion needed to disengage a Jost fifth wheel.

BRIEF DESCRIPTION OF THE DRAWINGS

FIG. 2 shows a yanker in operational position on the fifth wheel of a truck tractor.
FIG. 3 is a closeup view of the yanker raising a release handle and moving the handle cabward.

DETAILED DESCRIPTION OF THE PREFERRED EMBODIMENT

Figure 1:
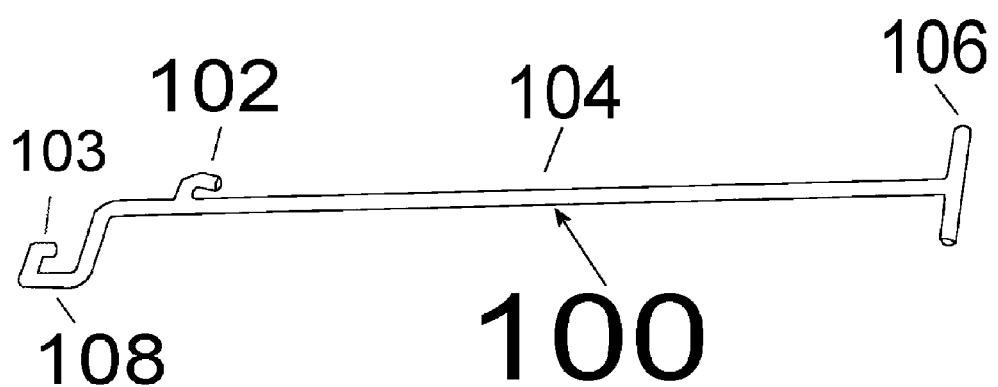
FIG. 1 shows a yanker.

Referring to FIG. 1, the yanker 100 consists of a yanker hook 102 which hooks the release handle of a fifth wheel, a yanker shaft 104 ending in a yanker handle 106 which is gripped by the trucker. A yanker lever 108 points generally opposite the direction of hook 102. A secondary hook 103 is at the end of lever 108. All pieces of the yanker are preferably made of half-inch steel rod, or similar rod-like material.

FIG. 2 shows the yanker in operational position atop tire 201. Hook 102 engages the release handle 202 of the fifth wheel 203.

FIG. 3 shows the yanker lever 108 contacting tractor frame 204, where the frame is the tractor structure under the trailer. By twisting yanker handle 106 (in FIG. 1 or 2) counterclockwise, yanker lever 108 presses upon frame 204 and pushes hook 102 and therefore release handle 202 upward and with further twisting, cabward (the cab is out of view and to the left in this view.) Release handle 202 is welded to release actuator 207, which is urged upward and then cabward onto shelf 206, which holds handle 202 in a position where it can be pulled outward. The trucker then pulls yanker handle 106 outward, releasing the trailer from the fifth wheel 203. Reaching deep under the trailer is avoided, and since the yanker lever 108 is pushing hook 102 upward, rather than the trucker's arm from a distance, the trucker's biomechanical strain is reduced. For non-Yost brand release handles requiring a simple pulling action, secondary hook 103 (in FIG. 1) may be used.

The invention is not limited to the preferred mode illustrated. For instance, the invention is disclosed as having a counterclockwise twist to urge the release handle upward and cabward, but could be used with a clockwise twist if the release handle were on the right side of the truck. The yanker handle 106 is disclosed as being formed from tubular metal, but a loop of the same material as the body would be operable, and could have a more grippable surface, similar to a bicycle handle. The yanker is disclosed as being made of steel, but other strong materials could be used. These and other variants are within the spirit and scope of the claims below.

I claim:
1. A yanker for releasing a trailer from a tractor, the yanker comprising
a yanker shaft extending between a first end connected to a yanker handle, and a second end connected to a yanker lever, the yanker lever having a first linear section extending laterally away from the second end of the shaft, and the yanker lever having a second linear section extending laterally from the first linear section in a direction away from the yanker handle, and
a yanker hook connected to the yanker shaft proximate the second end and on a side of the yanker shaft opposite the yanker lever, the second linear section of the yanker lever pointing generally opposite the direction of the yanker hook, and wherein, when the second linear section of the yanker lever contacts a top surface of a frame of the tractor and the yanker handle is twisted clockwise or counterclockwise, the yanker hook moves upward.

2. The yanker of claim 1, wherein the yanker hook has a first linear segment and a second linear segment connected to the first linear segment, the first linear segment extending laterally outward from a surface of the yanker shaft, and the second linear segment extending at an angle from the first linear segment toward the yanker handle, the second linear segment and the axis of the yanker shaft being skew.

3. The yanker of claim 1, wherein the second linear section of the yanker lever extends parallel to the axis of the yanker shaft.

4. The yanker of claim 3, wherein the yanker lever has a third linear section extending laterally from the second linear section and parallel to the first linear section.

5. The yanker of claim 4, wherein the third linear section has a length that is less than a length of the first linear section.

6. The yanker of claim 4, the yanker having a fourth linear section extending from the third linear section and parallel to the second linear section.

7. The yanker of claim 6, wherein the fourth linear section has a length that is less than a length of the second linear section.

8. The yanker of claim 3, the yanker hook having a first linear segment and a second linear segment connected to the first linear segment, the first linear segment extending laterally outward from a surface of the yanker shaft, and the second linear segment extending at an angle from the first linear segment toward the yanker handle, the second linear segment and the axis of the yanker shaft being skew.

9. A yanker for releasing a trailer from a tractor, the yanker comprising
  a yanker shaft extending between a first end connected to a yanker handle, and a second end connected to a yanker lever, and
  a yanker hook connected to the yanker shaft proximate the second end, the yanker lever pointing generally opposite the direction of the yanker hook,
  wherein the yanker lever has a first linear section extending laterally from the second end of the shaft, and a second linear section extending laterally from the first linear section and parallel to the axis of the yanker shaft, a third linear section extending laterally from the second linear section and parallel to the first linear section, and a fourth linear section extending from the third linear section and parallel to the second linear section, and
  wherein, when the second linear section of the yanker lever contacts a top surface of a frame of the tractor and the yanker handle is twisted clockwise or counterclockwise, the yanker hook moves upward.

10. The yanker of claim 9, wherein the third linear section has a length that is less than a length of the first linear section.

11. The yanker of claim 9, wherein the fourth linear section has a length that is less than a length of the second linear section.

\* \* \* \* \*